United States Patent [19]
Schroeder

[11] 3,719,931
[45] March 6, 1973

[54] APPARATUS FOR CONTROLLING MACHINE FUNCTIONS

[75] Inventor: Roger L. Schroeder, Springfield, Vt.

[73] Assignee: Bryant Grinder Corporation, Springfield, Vt.

[22] Filed: April 29, 1971

[21] Appl. No.: 138,512

[52] U.S. Cl. ............................................. 340/172.5
[51] Int. Cl. ............................................. G06f 15/46
[58] Field of Search ......... 340/172.5, 324; 235/151.1

[56] References Cited

UNITED STATES PATENTS

| | | | |
|---|---|---|---|
| 3,324,458 | 6/1967 | MacArthur | 340/172.5 |
| 3,267,434 | 8/1966 | Clark et al. | 340/172.5 |
| 3,351,912 | 11/1967 | Collom | 340/172.5 |
| 3,374,464 | 3/1968 | Brothman | 340/172.5 |
| 3,387,084 | 6/1968 | Hine | 340/172.5 X |
| 3,581,289 | 5/1971 | Wilhelm | 340/172.5 |

Primary Examiner—Gareth D. Shaw
Assistant Examiner—Sydney R. Chirlin
Attorney—McGlynn & Reising, Milton & Whington and James H. Bower

[57] ABSTRACT

A sequence controller for industrial machinery including a solid state sequencer operating as a logical stepping switch, a pair of programmable matrices for creating output signal combinations of selected permutations in response to sequencer outputs, one matrix being arranged to effect machine functions and the other being arranged to effect inputs to a comparator indicating machine requirements which are due. The comparator is connected to receive corresponding signals from the machine when the conditions are met and then to advance the sequencer. Paired lights on a control-display panel indicate the machine status during a sequence. Logical interlocks are provided to inhibit certain functions in the programmed sequence until certain other functions have been accomplished.

28 Claims, 8 Drawing Figures

INVENTOR.
Roger L. Schroeder

INVENTOR.
Roger L. Schroeder
BY
Barnard, McGlynn & Reising
ATTORNEYS

INVENTOR.
Roger L. Schroeder
BY
Barnard, McGlynn & Reising
ATTORNEYS

APPARATUS FOR CONTROLLING MACHINE FUNCTIONS

This invention relates to controllers for industrial machines.

It is well known that various industrial machines such as grinders, borers, etc. are best operated by at least semiautomated controllers. Much sophistication has developed, for example, in the numerical control art where long and complicated tape-carried programs are employed to direct the movements of a multiaxis machine tool. Considerably less sophistication is apparent, however, in controllers for less complex machines such as grinders. In this area, controllers are often nonprogrammable, electromechanical contrivances which offer little in the way of positive failure prevention, diagnostic assistance in the event of a failure, ease of maintenance, and variability of operation.

In accordance with the present invention, a controller for industrial machines such as grinders and the like is provided, such a controller being capable of directing the performance of a sequence of operations while continuously monitoring the progress of the sequence, thus, to provide an immediate indication of the status of the controlled functions at all times. Such information may be displayed, for example, in such a fashion as to facilitate trouble shooting operations in the event of a failure.

In a specific embodiment of the invention, the status monitoring and display objectives of the invention are accomplished by program means for establishing the sequence of controlled operations and a first plurality of indicators for indicating the requirements of the sequence as they come due. In addition, a coincidence monitor is provided for determining on the basis of signal sources, such as limit switches and the like, when the sequence requirements are met. This coincidence monitor functions to actuate a second plurality of indicators, thus, to establish a record of requirements due and met during the sequence. The coincidence monitor also functions to advance the sequence.

In the illustrative and preferred embodiment of the invention hereinafter described in detail, the requirements due and met indicators take the form of small light pairs disposed in a central display panel for operator perusal. Thus, should a failure occur during a machine sequence, the operator need but look at the panel to know that either (a) condition requirements have been duly established but not met according to the sequence, or (b) condition requirements not yet established have, for some reason, been attained in the machine at the wrong time. As will be apparent to those skilled in the art, indicators other than paired lights may be employed.

According to a further feature of the invention, a given machine may be selectively reprogrammed to accomplish variations in the sequence of functions to be preformed. This is accomplished through the use of a sequencer which operates in the manner of a stepping switch to sequentially energize a plurality of signal lines and a program or encoder matrix for selectively interconnecting the signal lines to power channels and, thus, to controlled instrumentalities. In an electrical system, as hereinafter described, the lines and channels take the form of electrical circuit paths and the matrix takes the form of a diode pin board. This board, which is readily programmable by manual relocation of diode pins, may be used permanently or, alternatively, may be used for initial program definition whereafter it is replaced by permanently wired matrices of various types in a plug in form to permit one program matrix to be replaced with another.

According to a still further feature of the invention, program-independent safety interlocks are established to prevent dangerous or potentially catastrophic machine functions from being inadvertently caused. Thus, for example, a controlled machine cannot be caused to place two or more controlled components in conflicting positions albeit programming may call for such a conflict. This is accomplished by providing, interlock connections as a part of the output circuits of the system. The interlock logic receives signals directly from controller input circuits, or from other output circuits, bypassing the sequence control logic. Thus, it is possible to require that a given switch, for example, be closed in order that a particular output circuit be allowed to operate, preventing potentially dangerous or destructive machine operation resulting from programming errors or logic system failures. In addition, connections may be made between output circuits to prevent rather than enable the simultaneous operation thereof. The interlock inputs described in the illustrative embodiment herein require that a signal be present at all times to enable the associated output circuit. Thus, when interlock inputs are not used, they are connected to a signal source such as a reference voltage point.

According to a still further feature of the invention as specifically embodied in an industrial machine such as a grinding machine which is used in an atmosphere which is often oily and pregnant with foreign particles, the signal devices, such as limit switches and the like, indicating the meeting of requirements, and the controlled instrumentalities such as solenoids and motors are operated on comparatively high line voltage, such as 115 volts, while logic signals within the controller operate at a comparatively low level such as 5 volts. In general, this is accomplished through the use of input and output converters of which the input converters are preferably of the type in which a light signal is employed to actuate a photocell, thus, accomplishing good electrical signal isolation in addition to voltage conversion. The output converters are preferably implemented with glass enclosed magnetic reed relays in combination with suitable amplifier devices.

In accordance with a still further feature of the preferred embodiment hereinafter described, non-chronological sequences of functions may be programmed to accomplish looping, or step repetition, and branching, or effective step skipping, operations. In general this is accomplished in the programming and coincidence matrices by establishing function requirements for certain sequence steps which can be satisfied or obviated by independent variables such as the passing of time or the repetition of a sequence some predetermined number of times.

These and other features and advantages of the invention will become more apparent from a reading of the following specification, setting forth in detail an illustrative, solid state electronics embodiment of the invention as used to control a grinding machine such as the Bryant CENTA-FORM, a large industrial grinder made by the Bryant Grinder Corporation of Springfield, Vermont. The specification is to be taken with the accompanying drawings of which:

Figure 1:
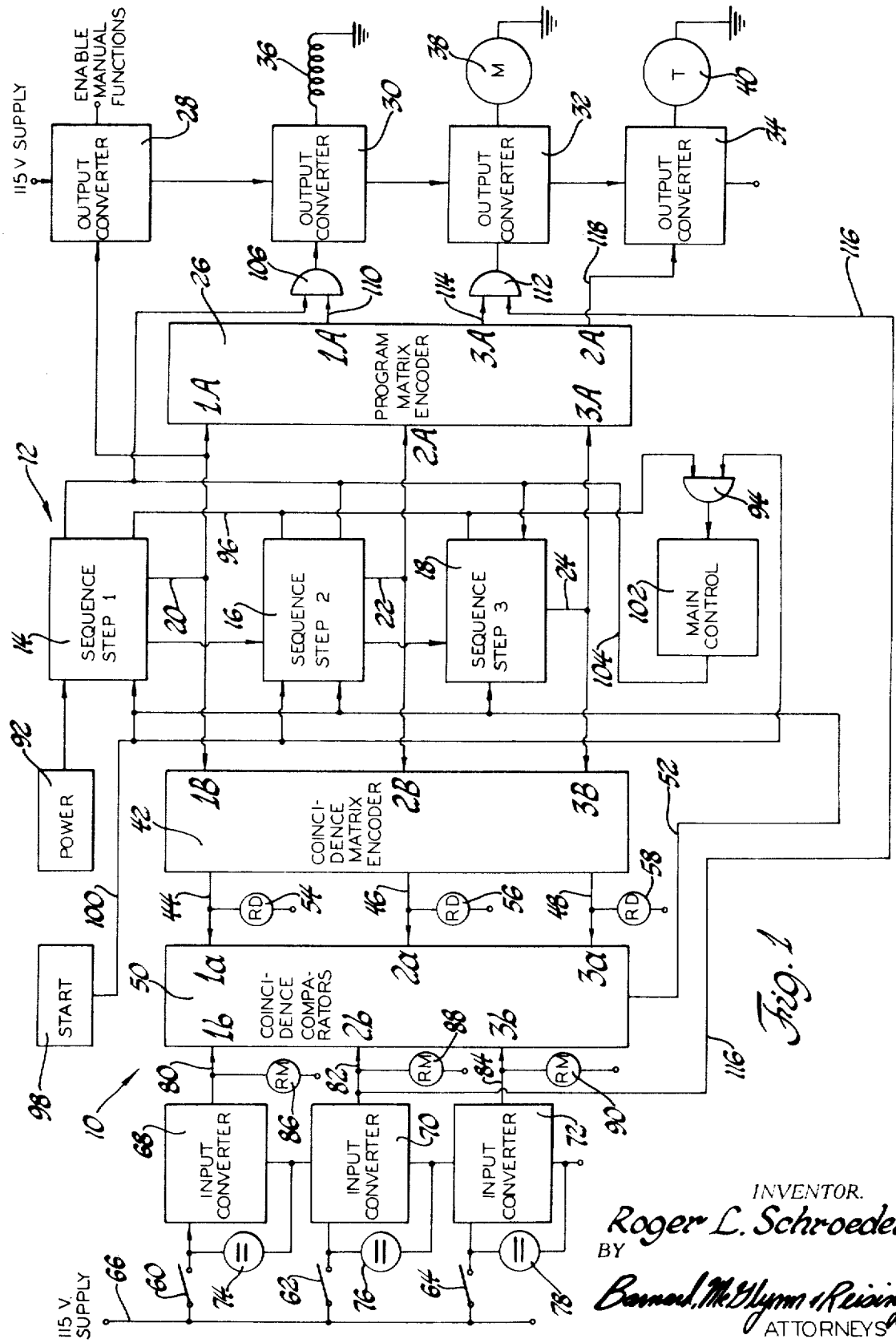
FIG. 1 is a block diagram of a control system embodying the invention.

Referring now to FIG. 1, there is shown a controller 10 illustrating the invention as applied to the control of a sequence of machine functions to be followed by a grinding machine such as the Bryant CENTA-FORM. In such a machine a grinding wheel and a part to be finished are moved by suitable motive power devices relative to one another to assume various contact positions. In addition, the grinder wheel is periodically checked for size and shape and is dressed as necessary. Moreover, the various motive power means, such as motors, may be driven in opposite directions and at selected speeds. Other machine functions such as the flow of coolant and the loading of parts are necessarily accomplished in such an industrial machine as the Bryant CENTA-FORM grinder and are controllable in a preprogrammed sequence by the controller 10 of FIG. 1. The application of the controller 10 to a grinder is, of course, purely illustrative of the utility of the invention as it is perfectly foreseeable that other applications of the controller 10 are possible.

Describing the embodiment of FIG. 1 in detail, controller 10 comprises a sequencer 12 which operates in the nature of a stepping switch to produce, under normal operating condition, a sequence of electrical output signals. Sequencer 12 in the illustrative embodiment of FIG. 1 comprises stages 14, 16, and 18 having signal output lines 20, 22, and 24, respectively. Although only three stages are shown in FIG. 1 for the sequencer 12, it is to be understood that the typical application of controller requires a greater number of stages. Therefore, the selection of three stages is merely representative.

Output lines 20, 22, and 24 are normally energized at a logic voltage level in numerical order to provide inputs to a sequence programmer in the form of a diode matrix 26. The matrix 26 is preferably a programmable, two-dimensional pin-diode array having sequentially energized input lines corresponding to lines 20, 22, and 24 and a plurality of output lines which may be selectively interconnected with the input lines by the insertion of diode pins. Such matrices are commonly used as programmable encoders and a suitable device is available from the Sealectro Corporation of Mamaroneck, New York. The diode matrix encoder 26 is programmed to energize predetermined combinations of one or more output lines in response to the sequential energization of the lines 20, 22, and 24 by sequencer 12. The machine function generators, such as solenoids, motors, timers, and so forth, which are controlled by the combination of one or more output lines energized receive signals from the diode matrix encoder 26 through the output converter units 28, 30, 32, and 34. Again, only four units are illustrated as being representative of the invention, the ordinary application of the controller involving more than four machine function generators and, thus, more than four output converter units. All of the output converter units 28, 30, 32 and 34 are connected to a 115 volt supply source so as to function to increase the power levels of signals applied to the machine function generators and to isolate the logic circuitry which drives the converters from the higher voltage machine function generators. In FIG. 1 the output converter 28 is wired to perform an enable function wherein all manually controlled functions of the grinder machine are powered up. Output converter 30 is connected to energize a coolant solenoid 36, output converter 32 is wired to energize a motor 38 and output converter 34 is wired to set a timer 40.

Controller 10 further comprises a coincidence monitor which receives information regarding the machine function requirements which are due in accordance with the programming of matrix 26 and the sequential energization of the stages in sequencer 12. The coincidence comparator also receives information when the machine function requirements due have been met. A comparison of these two information quantities is employed in the controller 10 of FIG. 1 to evaluate the propriety of the operating condition of the controlled machine and to advance the program sequence if everything is in order.

The coincidence comparator comprises a second diode matrix 42 which like the matrix 26 comprises a plurality of input lines corresponding to the sequentially energized signal line 20, 22, and 24 and a plurality of output lines which are energized in predetermined programmable combination of one or more in accordance with the physical location of diode interconnections in a matrix board. Again, a manually programmable device of the type available from the Sealectro Corporation is suitable. Alternatively, a permanently wired diode matrix or other such coincidence encoder device as may be desired can, of course, be used.

Diode matrix 42 is shown to have three output lines 44, 46, and 48, these of course being representative of the normally greater number of output lines employed, connected to one side of a plurality of coincidence comparators 50. As indicated by the slight offset in the alignment of the input lines 20, 22, and 24 and the output lines 44, 46, and 48 of the encoder 42, there is no set correspondence between the location of the input and output lines in the drawing since the particular output lines which are energized by any input signal is purely a function of the internal programming of the matrix 42 and, of course, more than one output line may be energized at any given time.

The coincidence comparators 50 are simply signal coincidence monitors constructed of suitable logic units as will be hereinafter described in greater detail each having two inputs and an output which is energized when the proper signal conditions obtain at the two inputs. In actual practice, it is not always possible to prescribe the precise state of all machine switches for every machine cycle step. Many times unexpected signals are present which may be safely ignored. Further, it is contrary to safe practice to require that a particular signal be absent and to allow a machine function to advance based on signal absence. The comparator circuit is, therefore, best implemented to check for all signals specified by the coincidence matrix and to ignore any signals which are present and not called for by the coincidence matrix. In the controller 10 of FIG. 1, the inputs to one side of respective comparator portions are labeled 1a, 2a, and 3a while the coincidental and corresponding inputs to the other side of those same comparator portions are labeled 1b, 2b, and 3b. The signals appearing at the a inputs represent machine function requirements due while the inputs at the b terminals represent machine requirements met. When for any step in the sequence represented by the energization of the signal line 20, 22, or 24, all of the condition requirements due are coincident with the corresponding machine requirements met, an "advance" signal appears on coincidence comparator output line 52 and is applied concurrently to all of the sequencer stages 14, 16, and 20 to advance the sequence to the next stage or from the last stage back to the first, thus, to establish a continuous, cyclical mode of operation.

Figure 2:
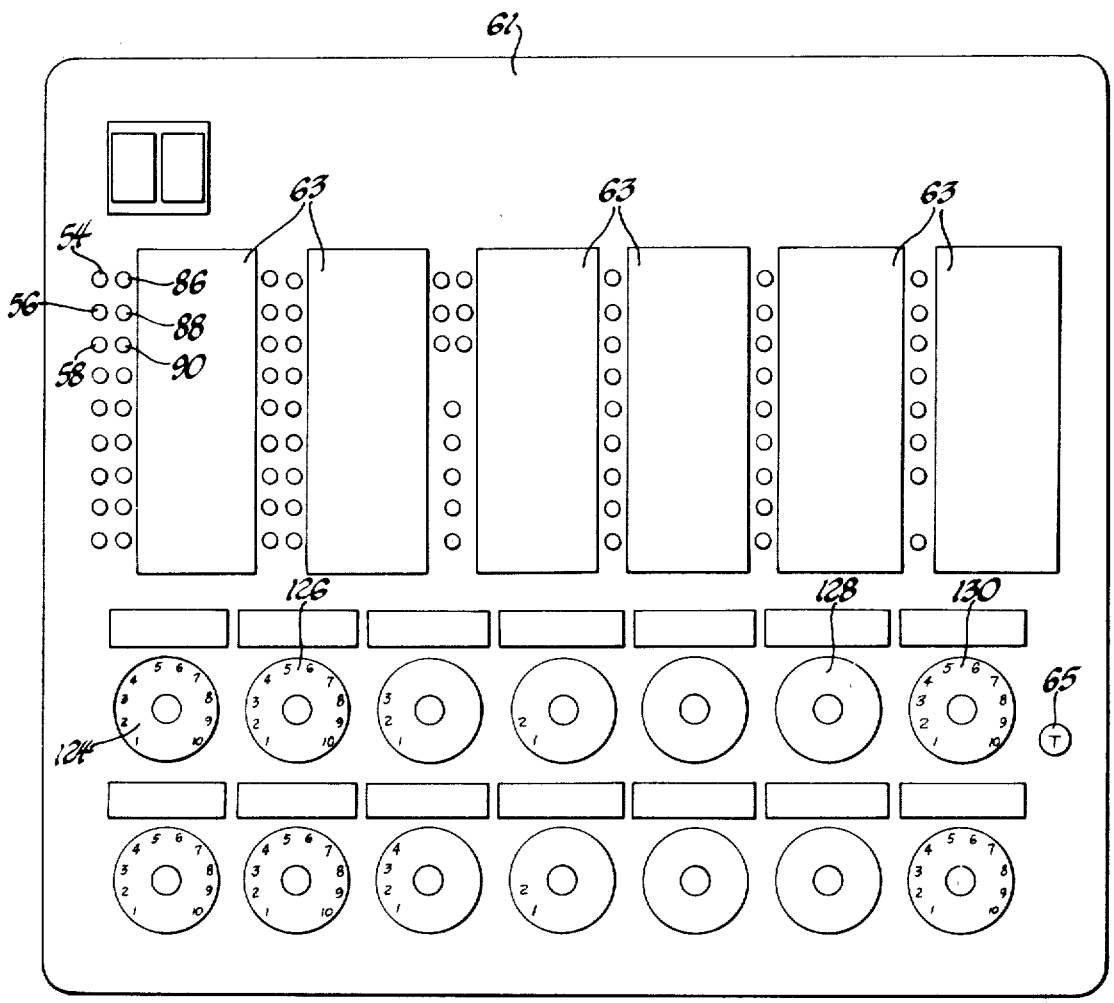
FIG. 2 is a plan view of a control panel for us in connection with the embodiment of FIG. 1.

The coincidence matrix output lines 44, 46, and 48 have associated therewith a plurality of machine condition requirements due indicators in the form of small, low-voltage lights 54, 56, and 58, respectively. These lights are illuminated through suitable lamp drivers as the output lines with which they are associated are energized and are located on the face of a control panel 61, shown in FIG. 2. As FIG. 2 illustrates, there are 21 such requirements due indicator lights arranged in pairs with other lights hereinafter described and disposed alongside of suitable legend cards 63 bearing descriptions of the machine functions which are due when the associated lights are illuminated.

To provide the information regarding the meeting of machine requirements, machine function signal sources 60, 62, and 64 are mechanically associated with the machine functions being controlled or monitored. The sources 60, 62, and 64 are illustrated as limit switches but these may be other sources such as hard contact devices typically found in associated with industrial machinery. One side of each of the signal source switches 60, 62, and 64 is connected to a 115 volt supply line 66 such that all of the associated switches are normally capable of providing their respective signals even under adverse conditions of oil and grimy atmosphere. The high-voltage signals from the source switches 60, 62, and 64 are reduced to logic level voltages by respective input converters 68, 70, and 72. These converters preferably include small neon lights having associated photosensitive devices which become conductive upon illumination of the associated neon lights. Accordingly, good signal isolation is provided along with the suitable voltage transformation.

The input converter circuitry 68, 70, and 72 as well as various other circuitry in the controller 10 of FIG. 1 is preferably disposed on circuit boards which are individually removable from a master circuit board. To provide further assistance to trouble shooting and error or fault location, small neon lamps 74, 76, and 78 are connected outside of the circuit boards representing converter 68, 70, and 72, respectively, to indicate upon visual inspection whether the associated converter circuit is energized and operative. Lights 74, 76, and 78 do not correspond in identity with the internal lights which are used for photocell actuation but are externally illustrative of the operating condition thereof.

Converter 68, 70, and 72 are provided with output signal lines 80, 82, and 84, respectively, which are connected to the b inputs of respective comparator portions in the coincidence comparator 50. In addition, the lines 80, 82, and 84 are suitably interconnected with small low-voltage indicator lamps 86, 88, and 90 for indicating the metering of machine function requirements. As shown in FIG. 2, the lights 86, 88, and 90 are also carried by the control panel 61 and are arranged alongside the conditions due lights 54, 56, and 58, respectively. Thus, one may determine by glancing at the control panel 61, which is preferably disposed where an operator may view it during machine operation, which machine requirements have become due and which of these requirements have been met during the performance of any given machine function sequence. Thus, if any of the left-hand lights 54, 56, and 58 is illuminated without a corresponding illumination of the adjacent right-hand light, the operator is immediately advised that a condition due has not been met. Similarly, if a right-hand light 86, 88, or 90 is energized or illuminated without illumination of a corresponding left-hand light, the operator is advised that a machine condition has been established other than in accordance with the control program set by the encoder matrices 26 and 42. On the otherhand, hand, if both lights of any adjacent pair are lighted, the operator knows the machine function identified by that pair has been both called for and completed in accordance with the program. The control panel 61 is provided with a lamp test button 65 which when depressed illuminates all lights on the panel 61 to determine their operability. The circuitry needed to accomplish this function is straightforward and obvious to those of ordinary skill in the art and will, therefore, not be explained in detail.

Controller 10 is provided with a main power switch 92 having an output line which is connected directly to the first stage 14 in the sequencer 12 to energize output line 20 when power is applied. The energization of sequencer stage 14 produces an output signal on line 96 which is applied to one input of a logic gate 94. Another input to gate 94 is received from a cycle start switch 98 by way of the associated output line 100. When the two inputs to gate 94 are present, a main control memory 102 which may take the form of a standard flip-flop, toggles to produce an output on line 104. The signal appearing on line 104 is employed to enable all of the stages in sequencer 12 as shown. In addition, the signal on line 104, in the embodiment of FIG. 1, is connected as one of two inputs to a gate 106 for controlling the application of an input signal to the output converter 30 for the control of the coolant solenoid 36. The other input to gate 106 is received from the diode matrix encoder 26 by way of line 110.

Reviewing briefly the operation of the controller 10 as thus far described with reference to FIGS. 1 and 2, the diode matrix encoder 26 is suitably programmed such that upon sequential energization of lines 20, 22, and 24 the proper combinations of one or more output lines 110, 114, and 118 are energized in the proper order. Diode matrix 46 is correspondingly programmed so that upon energization of lines 20, 22, and 24 in sequence, the proper combination of machine function requirement due lines 44, 46, and 48 will be energized in the proper order. Thus, upon closing the power switch 92 and pressing the cycle start button 98 to advance the sequencer 12 through steps 1 and 2 and, thence, automatically through step three and any further steps which may be employed, the machine function generators are energized in programmed combinations of one or more and in a programmed sequence. The corresponding machine requirements signals are generated by the coincidence matrix encoder 42 and employed, first, to energize the requirements due panel lights 54, 56, and 58 and, second, to provide suitable inputs to the comparator units in the coincidence comparator 50.

As the sequence progresses, the machine function generators such as the solenoid 36, motor 38, and timer 40 are energized to produce machine tool movement, coolant flow, part movement and so forth. As the conditions which are required and carried out by the energization of these motive power or machine function generators are produced and completed, the machine function signal source switches 60, 62, and 64 begin to open or close as the case may be. Assuming closure of a switch indicates completion of the condition requirement due, the 115 volt signals are applied to the input converter 68, 70, and 72 in various combinations of one or more and in a programmable sequence. Thus, the outputs of the converters 68, 70, and 72 are employed first to illuminate the conditions met panel lights 86, 88, and 90 and secondly to complete the inputs to the comparators in comparator 50. If for any step of the sequence all of the $a$ inputs energized and all of the corresponding $b$ inputs are also energized, thus, indicating a coincidence and satisfaction of all requirements due with corresponding requirements met, an advance signal appears on line 52 to advance the sequence to the next step. This operation continues as long as the steps of the cycle are being performed properly. If for any reason the cycle should stop prior to completion, the operator needs only to look at the control panel 61 of FIG. 2 to determine the status of the program both with respect to machine function requirements due and machine function requirements met.

Referring again to FIG. 1, the controller 10 provides means hereinafter referred to as "interlocks" for positively preventing the initiation of certain machine functions unless other machine functions are in predetermined conditions. Moreover, the interlock means of controller 10 is hardwired and is, thus, independent of variations made in the programs of matrices 26 and 42. Such interlocks are highly desirable in grinding machines, for example, where a grinding operation should not be performed unless, for example, coolant is in flow. In another example, the dressing of a grinding wheel should not be initiated unless machine elements which might interfere with the dresser are cleared out of the path of the dresser so as to avoid a mechanical interference having potentially catastrophic results. There are many examples of applications for interlocks and it is not the intention of this specification to be exhaustive of such applications.

In controller 10 the specific interlock illustrated involves the energization of motor 38 and the positive prohibition against this energization unless coolant solenoid 36 is properly energized as indicated by the closure of switch 62. It is assumed in the following description that the energization of motor 38 takes place upon actuation of sequencer stage 18 and that this function follows the energization of coolant solenoid 36 during sequence step 2.

To accomplish the interlock, the output of input converter 70 appearing on line 82 is connected by way of line 116 to the input of AND gate 112. The other input to AND gate 112 is received from output 3a of the program encoder matrix 26 via line 114. Accordingly, gate 112 produces no output to the output converter 32 of motor 38 unless both input lines 114 and 116 are "true." Therefore, if step 2 causes the operation of the coolant solenoid 36 and, thus, the closure of switch 62, the initiation of the energization of motor 38 cannot be accomplished until the input converter 70 produces an output. Therefore, the motor 38 cannot be started until switch 62 is closed.

It is to be understood that while the use of AND logic elements is illustrated in FIG. 1 for the purpose of setting forth a specific embodiment of the invention, the use of NAND and NOR logic is in many instances preferable and further that the "true" input condition of such gates may be ground or zero volts rather than the 5-volt level which normally appears on the lines. Thus, a switch from a deenergized state to an energized state may, in accordance with the invention, represent a voltage change from 5 volts to zero volts or vice versa depending upon the preferences of the circuit designer.

It should be apparent from the foregoing that interlocks may be accomplished not only by logical additions of machine functions involving the physical movement of parts but also using time as a criterion. Thus, it may be desirable, for example, to delay the energization of a given device until a timer or counter has timed out or reached a predetermined counting level. This is easily accomplished by using a logic gate to combine the closure of a set of contacts again which might be represented by switch 62 and controlled by timer 40 so that a machine function for which a requirement is set in a subsequent sequence step cannot be initiated unless the timer controlled switch is closed. Again this is accomplished by hard wiring and is in one sense an interlock feature. In another sense it represents a method of accomplishing branching functions or departures from the ordinary numerical sequence on a selective basis. Timer 40, for example, might be manually set during sequence step 1 to establish a time period before which the energization of motor 38 cannot be accomplished. During this time period the sequence would simply end with step 2. As another example, the switch 62 having the interlock line 116 might be controlled by a counter such that sequence step 3 is omitted until a predetermined number of machine function cycles involving the other steps have been accomplished.

As will be apparent to those skilled in the art, it is possible using logic elements to vary the program as desired to accomplish many variations in nonnumerical sequence execution.

Referring again to FIG. 2, the control panel 61 is shown to carry in addition to the paired coincidence lights a plurality of potentiometers and timers. A timer 124 may, foe example, be employed to time out the reverse operation of a part loader. A timer 126 may be employed to manually set a time for a gauge insertion delay. Potentiometers 128 and 1300 may be manually set to vary the feedrate of motor 38 or the rate at which a new grinder wheel dresser is traversed, respectively. Any of the potentiometers may be represented by timer 40 in the circuit of FIG. 1.

Figure 3:
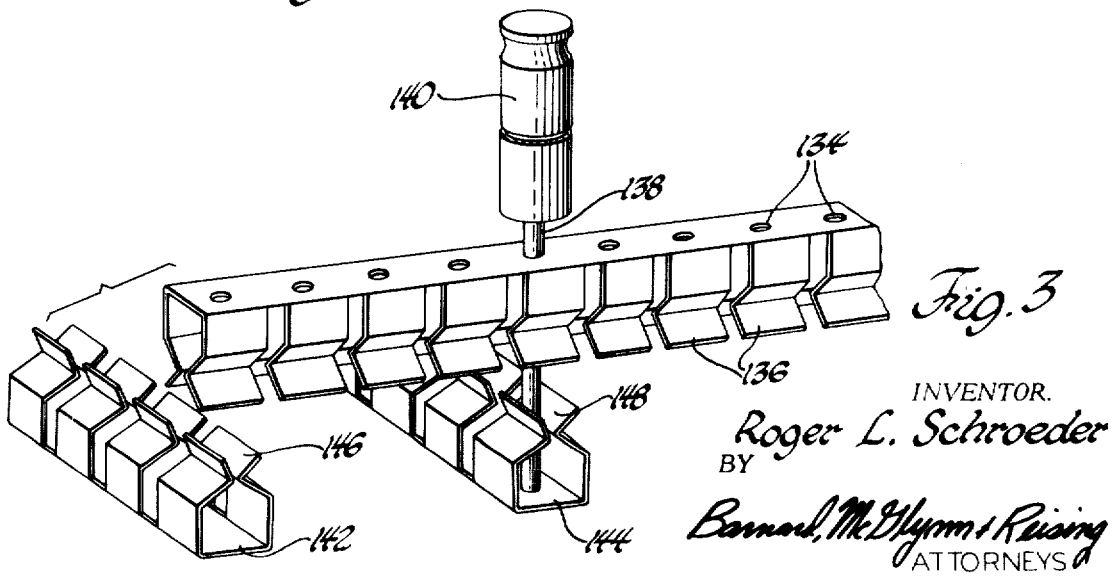
FIG. 3 is a partial perspective drawing of a suitable encoder matrix design for use in the embodiment of FIG. 1.

Referring now to FIG. 3, the details of a suitable construction for the matrices 26 and 42 is illustrated. In FIG. 3, the input lines corresponding to lines 20, 22, and 24 of the controller 10 of FIG. 1 are represented by an upper contact buss 132 having a plurality of vertically oriented holes 134 to admit a pin 138 of a diode pin 140 between the vertically depending resilient fingers 136. The lines of the matrix representing output lines 110, 114, and 118, for example, take the form of lower contact busses 142 and 144 which are provided with resilient fingers 146, 148, respectively, to receive and electrically contact the pins 138 of the diode pins 140. The upper contact busses 132 are oriented in one direction while the lower contact busses are oriented in a second direction at an angle of 90° from the first. Therefore, it is possible to establish a diode connection between any upper buss and any lower buss simply by manual insertion of the diode pin 140. All of the components shown in FIG. 3 are commercially available and in themselves form no part of the present invention. However, they are particularly suitable for implementation of the invention.

It may be desirable to employ the manually insertable diode pins 140 and the programmable matrix of contact busses shown in FIG. 3 only during the initial programming step whereafter the various connections may be hard wired. Using this technique a number of program matrices can be generated, each representing a slightly different permutation of output line energization to input line energizations and each capable of performing a slightly or greatly different function. If the controller 10 of FIG. 1 is implemented according to current state of the art in the form of plug-in circuit boards, an entire matrix may be removed and replaced with another matrix carrying a different program with about the same degree of facility as replacing a vacuum tube.

Figure 4:
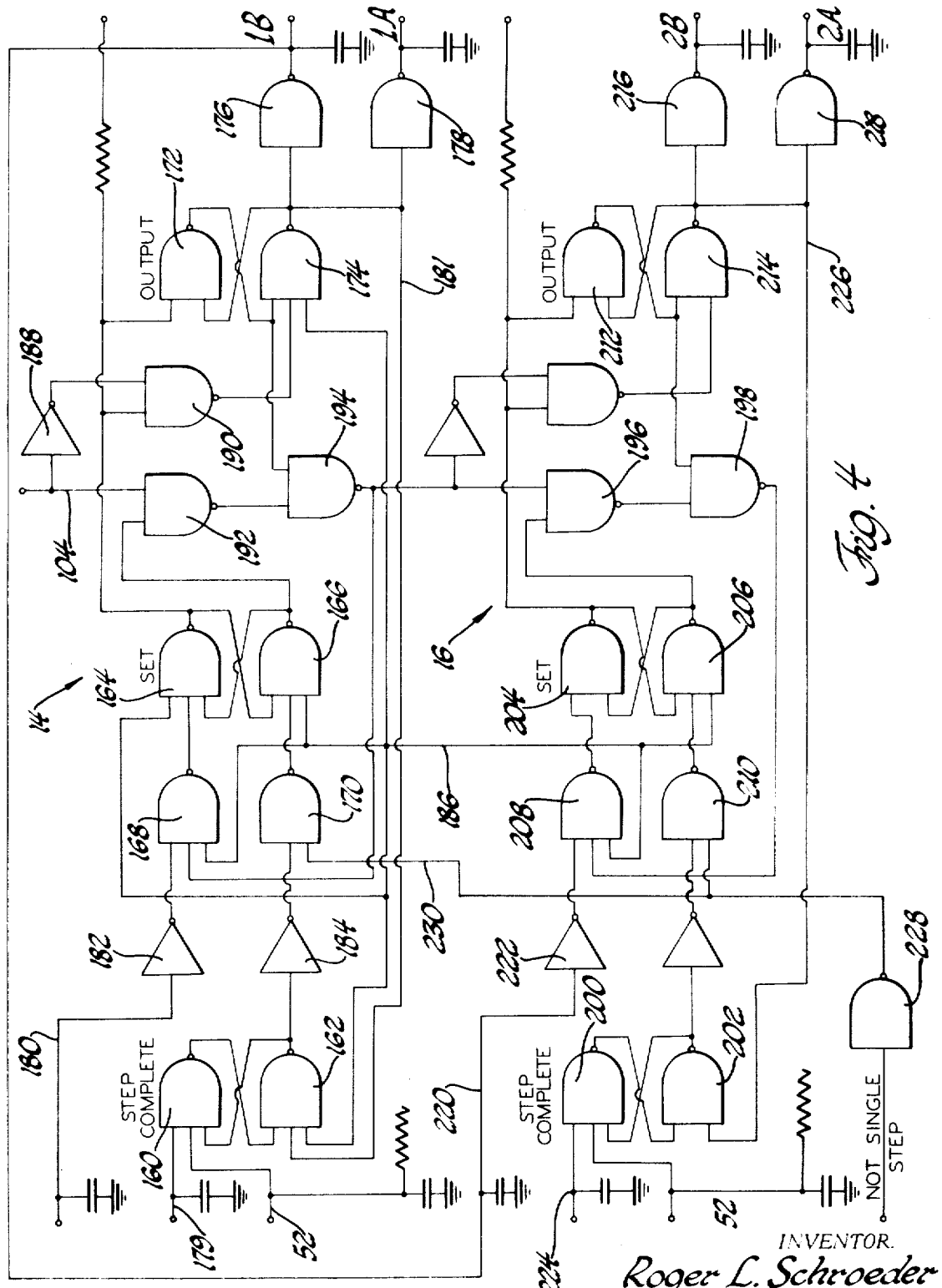
FIG. 4 is a logic diagram of a first sequencer circuit suitable for use in the embodiment of FIG. 1.

Referring now to FIG. 4, the logic diagram of an illustrative implementation of the sequencer 12 will be described in detail. In the logic diagram of FIG. 4 the logic elements take the form of inverting AND gates and signal inverters, however, it is to be understood that other logic circuit designs using other types of logic elements may be devised in accordance with the needs and desires of the individual circuit designer. In FIG. 4 the sequence stage 14 for step 1 is shown above the sequence stage 16 for step 2. Other sequence stages for additional steps are essentially if not exactly a repetition of a stage 16 and, thus, for simplification only two stages will be described.

Sequencer stage 14 includes three similar sections, these being a "step complete" section comprising gates 160 and 162 which are connected in cross-coupled complementary fashion, a "set" section comprising gates 164 and 166, also cross-coupled in complementary fashion, and an "output" section comprising gates 172 and 174, also being cross-coupled in complementary fashion. The gate 174 of the output portion is connected to an output gate 176 which furnishes the logic output 1B to the coincidence matrix 42 of FIG. 1 and an output gate 178 which furnishes the 1A logic output to the program matrix 26 of FIG. 1. The common connection between gate 174 and gates 176 and 178 is intended to correspond in essence but to illustrate in greater detail the single output line 20 of stage 14 in FIG. 1.

The "power on" signal from switch 92 appears on line 180 and represents the change from five volts to ground or zero volts when the power is applied. This signal is inverted by inverter 182 and applied to gate 168 of the "set" section of sequencer stage 14. Gate 168 in turn applies a signal to gate 164 of the "set" section which in turn causes that section to toggle indicating a readiness to perform manual functions during sequence step 1. The execution of these functions is caused by the application of a signal to line 179 from the cycle start switch 98 which causes gate 160 to toggle and to apply a signal through inverter 184 to gate 170 of the "set" section, thus, retoggling the "set" section as well as the "output" section by causing the output of gate 174 to become true, thus, energizing gates 176 and 178. It is apparent that the "output" section cannot be toggled unless the enabling signal on line 104 from the main control memory 102 is present. This signal is applied through an inverter 188 to a gate 190 which controls gate 174 in the output stage. The signal on line 104 is also applied to a gate 192 which is connected in a progressive ring counter type fashion with additional gates 194 of stage 14 and gates 196 and 198 of step two stage 16. Thus, no sequence step stage can be enabled unless the previous stage has been enabled. The advance signal on line 52 representing the completion of a step is applied to the "step complete" section gate 160 which retoggles that gate. The clear line 186 is provided for resetting all sequencer stages to the zero or initial condition and is connected commonly to gates 162, 164, and 174. A feedback connection 181 is provided between the output of gate 174 and the input of gate 162 to toggle the "step complete" section when the "output" section is properly activated.

The sequencer stage 16 similarly comprises a "step complete" section including gates 200 and 202, a "set" section comprising gates 204, 206, 208 and 210, and an "output" section comprising gates 212, 214, 216, and 218. The gates 216 and 218 represent the application of signal by way of line 22 to the coincidence matrix 42 and the program matrix 26, respectively, as was the cause with respect to gates 176 and 178 of stage 14. An input line 220 is connected to the output 1B of the first step stage 14 and is connected to apply this signal through an inverter 222 to the gate 208. This in turn applies a signal to gate 204 of the "set" section to establish the set condition in the second sequencer stage 16. The advance signal from the coincidence comparators 50 is applied by way of line 52 to the input of gate 200. Stage 16, thus, operates substantially as does stage 14 with the exception that stage two is preferably activated by the depression of the cycle-start button to close switch 98 in FIG. 1. In addition, sequencer stage 16 is provided with an auxiliary input on line 224 to gate 200 to permit the functions of step two to be essentially by-passed during any sequence of operations. This permits a signal to be applied to line 224 by a counter or timer, thus, to provide a nonnumerical or nonsequential operating mode in the controller 10 for a selected period of time or for a selected number of repetitions of the sequence. The clear line 186 is connected into gate 206 to clear the "set" section. In addition, the output of gate 214 is connected by means of a feedback path 226 to the input of gate 202 to toggle the "step complete" section of stage 16 when the outputs 2A and 2B are activated.

Finally, a gate 228 is connected to receive a controller signal to indicate that the sequence is to progress automatically and continuously rather than one step at a time. The output of gate 228 is connected via line 230 to gates 170 and 210 as "set" sections in stages 14 and 16, respectively. A simple push-button arrangement may be employed to generate this signal.

Figure 5:
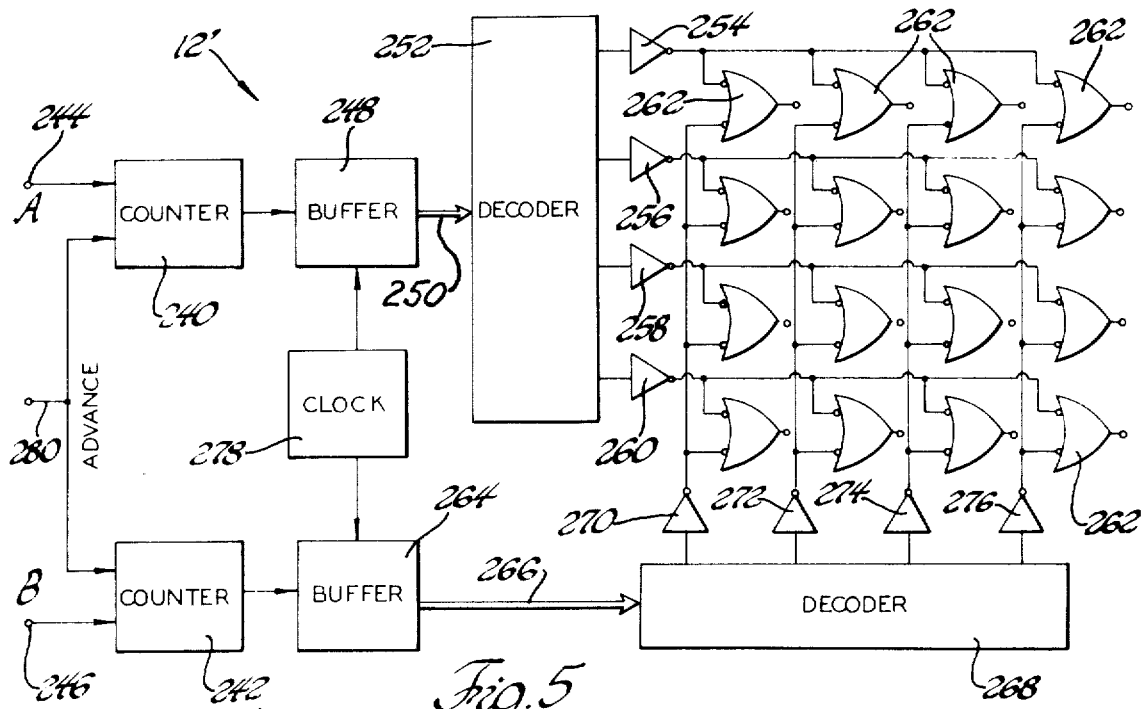
FIG. 5 is a block diagram of an alternative sequencer for use with the invention.

Referring now to FIG. 5, an alternative form of sequencer is illustrated. In FIG. 5 the sequencer is identified by the reference character 12' to indicate a structural and electrical difference with respect to the sequencer 12 illustrated in FIG. 1, but further to illustrate the fact that the circuit of FIG. 5 may be substituted for the sequencer shown in FIG. 1 and 4.

Referring to FIG. 5, an alternative sequencer 12' is shown to comprise a pair of digital pulse counter 240 and 242 for receiving discrete pulse inputs on input terminals 244 and 246. The pulse inputs represent numbers which in turn represent initial positions in a logic matrix comprising a two-dimensional array of NOR gates 262. Counter 240 is connected to a digital buffer storage unit 248 which in turn has a plurality of output lines represented by the buss 250 connected to a digital decoder 252 which responds to the pulse inputs from buffer 248 to select one of four output lines for signal energization. The output lines are connected through inverters 254, 256, 258, and 260, respectively, to the NOR gates 262, the pattern of connections being such that inverter 254 is connected to one input of each of the gates 262 in the uppermost horizontal row in the array, the inverter 256 is connected to one input of each of the next horizontal row of gates, the inverter 258 is connected to one input of each of the next horizontal row of gates and the output of inverter 260 is connected to one input of each gate 262 in the lowermost horizontal row of gates, as shown in FIG. 5. The outputs to the gates 262 from the horizontal row inverters 254, 256, 258, and 260 may, thus, be thought of as "half-select" pulses or signals, a coincidence of two such signals being required at any gate for complete energization thereof. The array of gates 262, thus, functions somewhat similarly to a magnetic core array wired for coincident current selection.

The counter 242 is connected through a buffer storage unit 264 and thence through a multiple output line as represented by buss 266 to a second decoder 268 which is similar, if not identical in design to decoder 252. The four output lines of decoder 268 are connected through respective inverters 270, 272, 274, and 276 to individual columns of the gates 262 in such pattern that the inverter 270 is connected to one input of each gate in the leftmost column and inverter 276 is connected to one input of each of the gates in the rightmost column, the inverters 272 and 274 being connected to the gates in the intermediate columns. The other "half-select" signals, thus, come from the inverters associated with decoder 268 and by application of a certain number to the A input terminal 244 and another certain number to the B input terminal 246 any one of the 16 gates 262 in the two-dimensional array may be selected for energization. In each gate in the array represents a step in a sequence of performable functions and the output of each gate 262 is connected to an output line such as to signal lines 20, 22, and 24 in FIG. 1, it can be seen that the application of suitable numbers is effective to select any step in a multistep process for energization and actuation. The buffers 248 and 264 are present to maintain a continuous flow of information and to eliminate time delays and preferably operate under the control of the digital clock 278.

To perform the functions of a stepper switch, the counters 240 and 242 are also connected to an input line 280 which receives the advance pulse from the coincidence comparators 50 in the controller 10 in FIG. 1. Thus, once a sequence has begun either with step one or some intermediate step by the application of coded numbers to the terminals 244 and 246, the sequence continues in numerical or nonnumerical order by the continuous application of advance pulses to line 280.

It is, of course, a simple matter to proceed in a nonnumerical fashion using the sequencer 12' in the controller 10 of FIG. 1. This may be accomplished, for example, by inserting a pin in the proper position in matrix 42 such that step five, for example, is designated by a "Branch Step." Other pins, associated with step five designate which input signals must be present. Still other pins associated with step five designate the step that will be branched to. If all required signals are present, the program transfers to the designated step. If all required signals are not present, the program advances one step. To further illustrate, suppose that step five is designated as a branching step and step 12 as the step to which we wish to branch. If coincidence is found to exist, that is to say all input requirements are met, at the time step five is initiated a code corresponding to step 12 will be applied to the input of counters 240 and 242. If all input requirements are not met at the time step five is initiated, the counter will be advanced to step six. In either case, the counter remains in step five for only a very brief period of time. For this reason, steps designated as branching steps may be considered separately from steps normally used for control of power functions. Thus, the sequencer of FIG. 5 in some ways represents an improvement over the sequencer 12 of FIG. 1 in that greater flexibility of operation is apparent.

Figure 6:
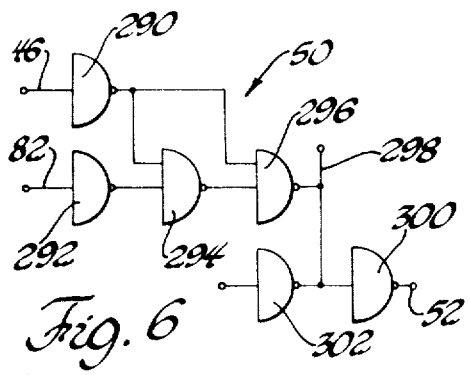
FIG. 6 is a detailed circuit diagram of a suitable comparator for use in the embodiment of FIG. 1.

Referring now to FIG. 6 a representative portion of the coincidence comparator unit 50 in the controller 10 of FIG. 1 is shown. The representative portion comprises the logic elements to perform the function of comparing the condition requirement input on line 46 of controller 10 with the requirements met signal on line 82 and to generate a signal on the advance line 52 when all condition requirements have been met. Line 46 representing one of the machine condition requirement signals is connected to the input of a NOR gate 290 while line 82 representing the requirements met or actual status signal is connected through a series of nor gates 292, 294, and 296. The output of gate 290 is also connected to inputs of gates 294 and 296. The output of gate 296 is connected to a line 298 which serves as a buss to pick up signals from other comparator portions having outputs connected directly to line 298. Line 298 is connected to the advance pulse line 52 through a NOR gate 300. The comparator portion comprising gates 290, 292, 294, and 296 follows the logic condition indicated as follows:

line 46 input 0 1 0 1 line 82 input 0 0 1 1 line 298 input 1 1 0 1

It will be apparent to those of ordinary skill in the art that a NOR gate of the type used in FIG. 6 produces a high output if any or both signal inputs are low, thus, high outputs appear on line 298 for the following conditions reading from left to right in the numerical statement above: where a requirement is established and met; where no requirement is established but a requirement is, nevertheless, met; and, in the righthandmost column where a requirement is neither established nor met. These high outputs are, of course, converted to low outputs by the gate 300 and applied by way of line 52 to the sequencer 12. In the third column from the left in the above statement the zero signal on line 46 represents a requirement, while the one on line 82 represents a failure to meet that requirement. Under these conditions the output on line 298 is low and the output on line 52 is high. As previously mentioned, a high output represents a "false" signal in the implementation of FIGS. 1 and 6. Finally, a gate 302 having an output connected to the input of gate 300 may be employed to automatically make the output high if any previous comparator portion is missing or disconnected. Thus, gate 302 is preferably connected through all comparator portions by means of a simple terminal strip to nullify the operation of the comparators if any circuit board, for example, is missing or improperly put in place.

Figure 7:
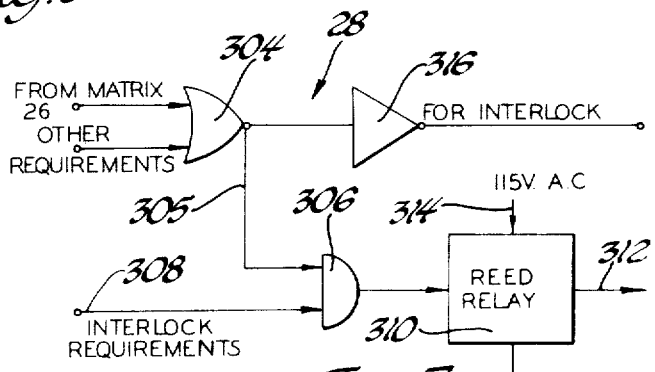
FIG. 7 is a detailed block diagram of a first output converter for use in the embodiment of FIG. 1; and, FIG. 8 is a detailed diagram of a second output converter for use in the embodiment of FIG. 1.

Referring now to FIG. 7, the internal details of a representative output converter 28 from the controller 10 of FIG. 1 are shown. In FIG. 7 the converter 28 is employed to generate a 115 volt AC output on line 312 which is a sufficient for the actuation of electromagnetic relays and the like. The five volt logic signals from the program matrix along with such other requirements including interlock requirements, timing requirements, and other signals are connected to an OR gate 304 the output of which is connected through line 305 to an AND gate 306. AND gate 306 conducts a logic signal when both line 305 and line 308 are true, line 308 representing an interlock requirement from one of the inputs to the coincidence comparator unit 50 or from some other point in the controller 10 of FIG. 1 as represents a legitimate interlock signal source. When gate 306 is conductive a signal is applied to the reed relay 310 to close a set of contacts connecting power from the 115 volt AC line 314 to the output line 312. The output of gate 304 may, in addition to being connected to gate 306, also be connected through an inverter 316 to such other output converter circuits as may be desired for the effect of proper sequencing and interlock functions.

The diagram for the output converter 28 of FIG. 7 is, of course, simply illustrative of one of many specific implementations which may be employed.

Figure 8:
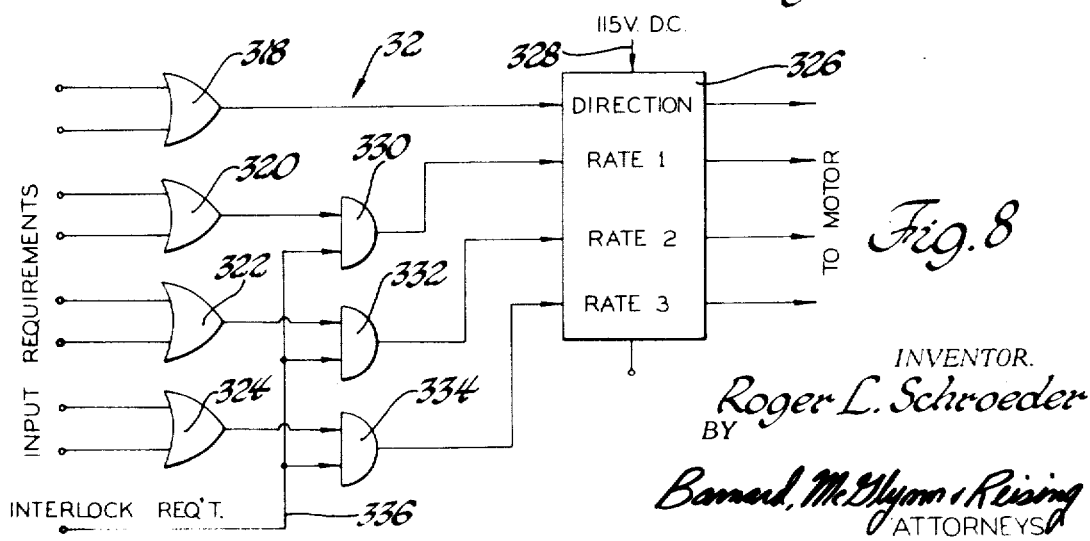

FIG. 8 illustrates the details of a second type of output converter, in this case the output converter 32 of controller 10 which is employed to control the application of power to a dc motor such as motor 38 of FIG. 1. In FIG. 8 various inputs are connected to OR gates 318, 320, 322, and 324 to control the flow of signals therethrough in accordance with the program established by matrix 26 and other interlock and timing requirements signals. The output of gate 318 is connected directly to a switch unit 326 to establish the direction in which the motor 38 is to turn. The outputs of gates 320, 322, and 324 are connected to one input of each of the AND gates 330, 332, and 334, respectively. The other input to each of these AND gates is connected to an interlock requirement signal line 336 which carries a signal which may be derived from an input to the coincidence comparator unit 50 or such other point in the controller circuit as may represent a proper condition precedent. The output of gate 330 is employed to select a first rotational rate for the motor 38. The output of gate 332 is employed to select a second rotational rate while the output of gate 334 is employed to select a third rotational rate. The 115 volt dc supply line 328 which is connected through the switch unit 326 may be connected on to other such output converters and particularly to the switching unit thereof to establish a sequence or chain of interconnections whereby the 115 volt dc power is interrupted should any switching unit circuit board be disconnected or removed.

It is to be understood that the foregoing description is illustrative in nature and is not to be constructed in a limiting sense.

The embodiments of the invention in which an exclusive property or privilege is claimed are defined as follows:

1. Apparatus for controlling sequential machine functions comprising: program means for establishing the sequence in which a plurality of machine function requirements are due, a first plurality of indicator means for indicating respective ones of such function requirements due in sequence, coincidence monitor means for monitoring the meeting of respective function requirements and for generating advance signals as function requirements due are performed, a second plurality of indicator means equal in number to said first plurality and disposed in correlated relation thereto for indicating respective ones of such function requirements preformed, and sequencer means for advancing the program means in response to advance signals from the coincidence monitor means.

2. Apparatus as defined in claim 1 wherein the first and second indicator means each includes a plurality of lights, a support panel for the lights, the lights being arranged such that each light of the first indicator means is paired adjacent a light of the second indicator means representing a corresponding machine function.

3. Apparatus as defined in claim 1 including means for placing the first and second indicator means in a reference condition upon completion of the sequence.

4. Apparatus as defined in claim 1 wherein the program means comprises an encoder having a plurality of input signal lines which are sequentially energized by the sequencer means and a plurality of output lines representing machine functions, the encoder being programmed to produce a precorrelated energization of output lines in response to the sequential energization of input lines.

5. Apparatus as defined in claim 4 wherein the encoder is a diode matrix.

6. Apparatus as defined in claim 5 wherein the first indicator means comprises a plurality of signal devices, respective devices being connected to be energized upon energization of the input lines.

7. Apparatus as defined in claim 5 wherein the diode matrix includes a two-dimensional circuit board and a plurality of removable diode pins for establishing connections between the input and output lines.

8. Apparatus as defined in claim 4 wherein the sequencer means comprises a plurality of signal stages each having an input and an output, the outputs being connected to the input lines of the encoder to sequentially energize said input lines, the output of each stage being further connected to the input of the next stage to provide a progressive, sequential actuation thereof.

9. Apparatus as defined in claim 4 including a plurality of converter means for increasing the power level of signals appearing on respective encoder output lines.

10. Apparatus as defined in claim 1 wherein the sequencer means comprises a two-dimensional array of logic elements each having two inputs and an output, means for generating number sequences, first decoder means responsive to the numbers in the sequences for selecting rows of inputs in the array, and second decoder means responsive to the numbers in the sequences for selecting columns of inputs in the array thereby coincidentally selecting for energization one logic element for each number in a sequence.

11. Apparatus as defined in claim 10 including means for applying advance signals for the coincidence monitor means to the first and second decoder means to increment the number sequences generated thereby.

12. Apparatus as defined in claim 1 wherein the coincidence monitor means comprises an encoder having a plurality of input signal lines connected to be sequentially energized by the sequencer means and a plurality of output lines corresponding to respective machine functions, the encoder being programmed to produce energization of at least one output for each input line, and a plurality of signal comparator means each having two inputs and an output which is energized when all required signals are present at the inputs, one input of each comparator means being connected to be energized by an encoder output line representing a requirement due and the other input being connected to be energized upon completion of a corresponding machine function representing a requirement met.

13. Apparatus as defined in claim 12 wherein the encoder is a programmable diode matrix.

14. Apparatus as defined in claim 12 wherein at least some of the comparator means have the inputs thereof connected through logic elements to indicate coincidence thereof with other machine requirements.

15. Apparatus as defined in claim 14 including means controlled by said logic elements for inhibiting selected machine functions according to the state of coincidence between such machine functions and other machine functions.

16. Apparatus as defined in claim 12 including a plurality of converter means connecting machine function signal sources representing requirements met to said other comparator inputs for decreasing the power level of the signals from said sources.

17. Apparatus as defined in claim 16 including, as a machine function signal source, a limit switch.

18. Apparatus as defined in claim 16 wherein each of the converter means includes a light source controlled by the machine function signal source, and a photosensitive element activated by the light source.

19. Apparatus as defined in claim 16 wherein the first indicator means are connected to be energized by respective output lines of the encoder means, and the second indicators are connected to be energized by respective machine function signal sources.

20. Apparatus as defined in claim 19 wherein each of the first and second indicator means is a plurality of low voltage lights.

21. Apparatus as defined in claim 20 including a display panel, the lights of the first and second indicator means being arranged on the panel in pairs representing corresponding machine functions.

22. Apparatus as defined in claim 12 wherein the comparator means are connected in a serial relationship to provide an output signal whenever all requirements due for a single energized encoder output line are met, the output signal being connected to advance the sequencer means.

23. Apparatus as defined in claim 14 including a timer, the output of the timer being connected through a logic element to a comparator means to indicate coincidence thereof with at least one other machine function.

24. Apparatus as defined in claim 1 including at least one motive power means connected to be energized by the program means.

25. Apparatus as defined in claim 1 including a plurality of magnetic reed relays connected to be closed in sequence by the program means, and machine function generators connected in circuit with the relays to be energized thereby.

26. A machine function sequence controller comprising: a sequence signal generator responsive to advance inputs to generate outputs on respective signal lines; a first programmable encoder matrix having plural inputs connected to receive the outputs from the sequence signal generator and plural outputs which are energized in predetermined combinations to effect machine functions responses; a plurality of output power level converters for connecting the outputs of the programmable encoder matrix to respective machine function generators for increasing the power level of signals applied thereto; a second encoder matrix having plural inputs connected to receive the outputs from the sequence signal generator and plural outputs which are energized in predetermined combinations to establish machine function requirements; a first plurality of indicator lights for indicating said requirements as they become due; a comparator having plural comparison input pairs and plural outputs, the outputs of the second matrix being connected to respective inputs of said pairs, a plurality of machine function signal generators for signalling the completion of machine functions; a plurality of input power level converters for decreasing the power level of respective signals from the signal generators and being connected to respective other inputs of said input pairs; a second plurality of indicator lights for indicating said requirements as they are completed; the second indicator lights being paired proximate first indicator lights of corresponding function; the comparator being responsive to the completion of all requirements for each step of the sequence to generate and apply advance signals to the sequence signal generator.

27. Apparatus for controlling cycles of sequential machine functions comprising: a program matrix responsive to energize inputs for establishing the sequence in which a plurality of machine requirements are due; sequencer means for applying a series of energizing inputs to the program matrix, input means for signalling the meeting of machine requirements, coincidence means for comparing the requirements due to the requirements met as indicated by the input means, and means for indicating the sequence of coincidence between requirements due and met during any cycle.

28. Apparatus as defined in claim 28 wherein the coincidence means is connected to the sequencer to advance the production of energizing inputs only when all requirements due for any function are met.

* * * * *